United States Patent [19]

Suzuki et al.

[11] Patent Number: 4,672,206

[45] Date of Patent: Jun. 9, 1987

[54] PASSIVE INFRARED DETECTOR

[75] Inventors: Muneo Suzuki; Mikio Kondo, both of Tsu; Makoto Morimoto, Hisai; Kazuhito Kayanoki, Tsu, all of Japan

[73] Assignee: Matsushita Electric Works, Ltd., Japan

[21] Appl. No.: 758,877

[22] Filed: Jul. 25, 1985

[30] Foreign Application Priority Data

Sep. 25, 1984 [JP] Japan ............................... 59-199901
Feb. 25, 1985 [JP] Japan ............................... 60-035860

[51] Int. Cl.[4] ............................ G01J 5/08; G01J 5/02

[52] U.S. Cl. .................................... 250/342; 250/347; 250/353

[58] Field of Search ........... 250/342, 353, 347, 338 R, 250/239, 221; 340/567, 600

[56] References Cited

U.S. PATENT DOCUMENTS

| | | | |
|---|---|---|---|
| 3,059,113 | 10/1962 | McHenry | 250/353 |
| 3,928,843 | 12/1975 | Sprout et al. | 340/567 |
| 4,081,680 | 3/1978 | Keller | 250/342 |
| 4,447,726 | 5/1984 | Mudge et al. | 250/342 |
| 4,484,075 | 11/1984 | Kahl, Jr. et al. | 250/342 |
| 4,514,631 | 4/1985 | Guscott | 250/342 |
| 4,529,881 | 7/1985 | Ceurvels et al. | 250/353 |

*Primary Examiner*—Janice A. Howell
*Assistant Examiner*—Constantine Hannaher
*Attorney, Agent, or Firm*—Stevens, Davis, Miller & Mosher

[57] ABSTRACT

A passive infrared detector including an optical collector releasably attached to a base with a sensor on which incident infrared radiation directed through the optical collector is focused. The sensor is held by a joint member which is pivotally supported on the base and to which said optical collector is releasably attached, whereby the optical collector is rotatable together with the joint member relative to the base for adjustment of its angular position and the optical collector can be alone replaced as necessary without having to replace the base, the sensor and its associated electric circuitry.

4 Claims, 24 Drawing Figures

PASSIVE INFRARED DETECTOR

BACKGROUND OF THE INVENTION

1. Field of the Invention

The present invention is directed to a passive infrared detector, and more particularly to a passive infrared detector for detecting the infrared radiation emanating from a person entering a monitored space to indicate the presence of the human in that space.

2. Description of the Prior Art

In the past, there have been provided a wide variety of passive infrared detectors comprising a single infrared sensor and an optical collector which gathers the infrared radiation from a space to be monitored and focuses the received radiation onto the sensor for providing an indication of the presence of a human being in that space. It is well known that the detector is desired to be pivotally supported on a base to be installed on a mounting surface such as a wall or ceiling for adjusting the angular orientation of the detector depending upon the geometry of the space being monitored. This is shown, for example, in U.S. Pat. Nos. 3,928,843 and 4,081,680. The former patent comprises a mirror assembly or optical collector with a sensor affixed thereto. The assembly is received within a housing which is mounted on a base by means of a swivel assembly so as to enable its angular position to be adjusted with respect to the base and therefore a wall or ceiling to which the base is installed. In the latter patent, a sensor is secured to an optical assembly in the form of a vat or trough-shaped reflector support which is provided with plural reflector elements for reflecting incident infrared radiation onto the sensor. The optical assembly combined with the sensor is pivotally supported by means of a bracket for the same purpose of adjusting its angular position. With the above prior detectors, when the optical collector is impaired or damaged while the sensor and associated electric circuitry of rather expensive construction are still operative, the entire assembly including the sensor and the electric circuitry have to be replaced together with the optical assembly. This imposes undue expenditure upon a user and may prevent the utilization of the detector in domestic and commercial applications. Further, when it is required to alter the covering range of space to be monitored or field of view, the entire detector assembly must be replaced with another type of detector having different optics suitable for receiving infrared radiation from the intended space or field of view, which also imposes undue expenditure as well as requires the cumbersome and inconvenient operation of removing the base of the existing detector from the mounting surface and then installing the new detector. This is disadvantageous in the sense that the sensor and its associated electric circuitry has to be replaced together with the associated optics or different types of optics. In this connection, none of the prior art detectors are found to disclose an arrangement in which the optical collector alone can be replaced while utilizing the sensor and its associated electric circuitry as the common components.

SUMMARY OF THE INVENTION

The present invention has been accomplished for the purpose of eliminating the above shortcoming and provides an improved and useful passive infrared detector. The infrared detector in accordance with the present invention comprises a base to be fixed on a mounting surface, an infrared sensor held on the base, and an optical collector which gathers infrared radiation from a space to be monitored and focuses such radiation onto said sensor of the base, said sensor being operative in response to receiving the infrared radiation to produce an output signal indicative of the human presence in the space. The optical collector is coupled to the base by means of a joint member to which said sensor is fixed at a position for receiving the radiation directed by the optical collector. The joint member is pivotally supported on the base so that the optical collector is rotatable in an exact radiation transfer relation with the sensor in relation to the base for adjusting its angular position. The optical collector is releasably attached to the joint member so as to be removed from the base as necessary, whereby the optical collector if damaged can be alone replaced with another collector without throwing away the base, sensor and its associated electric circuitry of relatively expensive construction, thus rendering an inexpensive replacement of the optical collector. Also with the above separate constructions of the optical collector and the base with the sensor, it is possible to selectively combine the optical collectors of different optics with the common base incorporating the sensor and its associated electric circuitry depending upon different geometrical configurations of a room or area to be monitored, which can be done in an economical manner by preventing duplication of expensive component parts.

Accordingly, it is a primary object of the present invention to provide a passive infrared detector which allows the optical collector to be alone replaced while utilizing the sensor and its associated electric circuitry as the common components to the optical collectors of different optics, rendering the detector to be adapted in widespread end uses without requiring undue increase in cost.

In a preferred embodiment, said joint member is formed as an electrically shielded case in which the sensor is received together with electric components forming an amplifier for amplifying the output signal from the sensor. Thus, the sensor and the amplifier thereof can be suitably protected from external noise signals to provide a reliable detection signal, which is therefore another object of the present invention.

For attaining said releasable coupling between the optical collector and the joint member, a permanent magnet is employed to be disposed on one of the optical collector and the joint member and the other is formed of magnetic material being attractable by the magnet. The permanent magnet can assure easy but secure coupling of the optical collector with the joint member and therefore provides a convenient replacing operation of the optical collector as well as secure positioning of the optical collector in exact radiation transfer relation with the sensor on the base, which is therefore a further object of the present invention.

Said joint member in the form of the shielded case is provided with a hat which allows only valid incident radiation originating from the intended space being monitored to be directed onto the radiation receiving surface of the sensor and at the same time to prevent undesired or spurious radiation originating from areas other than the intended space from impinging onto the envelop of the sensor. Thus, the envelope and therefore the sensor therein, can avoid being heated by such undesired radiation so as to be thermally protected therefrom, preventing the sensor from producing a false detection signal.

It is therefore a further object of the present invention to provide a passive infrared detector in which the sensor is protected by the hat to produce a reliable or true output signal representative of the received radiation from the intended space being monitored.

One of the optical collectors selectively attached to the base is designed to be of omnidirectional type which is shaped into a general configuration of the frustum of a cone with its sidewall defined by a plurality of Fresnel lenses, said Fresnel lenses being at different angular dispositions for determining the corresponding number of separate individual fields of view covering said space to be monitored. The Fresnel lenses extend along the entire circumference of the optical collector to provide a substantially 360 degree field of coverage and are arranged to have a common focal point so as to focus the received radiation from all of the fields of view onto the sensor. Included in the omnidirectional optical collector are a first and a second mirror surfaces one formed on the bottom and the other on the top of the frustum of cone. The first and second mirror surfaces are in facing relation and cooperative to reflect twice the radiation passing through each Fresnel lens onto the sensor, and they are disposed in an inclined relation with each other such that the distance therebetween is closer at its inward end than at the outward end. With this inclined combination of the first and second mirror surfaces, the radial dimension between each Fresnel lens and the sensor can be reduced in addition to that each Fresnel lens can utilize as radiation gathering segment its portion as close the center of lens as possible to enhance radiation collection capacity, the details of which will be explained in the detailed description of the preferred embodiment.

It is therefore a still further object of the present invention to provide a passive infrared detector which includes an omnidirectional optical collector having advantageous construction features such as effectuating the compact arrangement particularly with respect to its radial dimension yet assuring enough radiation collection performance.

Provided in close proximity to the sensor is a locator light source emitting visible light which will pass through the optical collector to reach the space intended to be monitored. Thus, by observing the visible light from the locator light a user can easily ascertain the location of the space to be monitored.

It is therefore a still further object of the present invention to provide a passive infrared detector including a visual check means by which the operator can conveniently locate the intended fields of view or space intended to be monitored.

The optical collector is covered by a removable shield which is transparent to infrared radiation of interest but attenuates it to a some extent. A sensitivity adjusting means is provided to compensate for the resulting attenuation of the output from the sensor receiving the radiation through the shield to such an extent as to give the same detection result based on the sensor output regardless of whether the optical collector is used with or without the shield. The sensitivity adjusting means is actuated in response to the optical collector being covered by the shield to be automatically set in operation for compensating such attenuation of the received radiation. The above shield is made to be substantially opaque to visible light for rendering the optical collector imperceptible or unnoticeable. In this connection, said locator light is arranged to be brought into operation of emitting the visible light only when the shield is removed.

It is therefore a still further object of the present invention to provide a passive infrared detector which can give the same detection result with or without the shield, yet requiring no manual and therefore inconvenient operation of compensating for the attenuation due to the use of the shield as well as avoiding accidental turning-on of the locator light with the shield remaining attached.

These and the other objects and advantageous features of the present invention will be more apparent from the following detailed description of the preferred embodiment when taken in conjunction with the attached drawings.

DETAILED DESCRIPTION OF THE PREFERRED EMBODIMENT

Referring to FIGS. 1 to 5, a passive infrared detector in accordance with a preferred embodiment is shown to comprise three types of optical collectors 1A, 1B, and 1C which are selectively attached to a common base 20 to be installed on a mounting surface such as the wall or ceiling of a room or area to be monitored. Included in the optical collectors are of omnidirectional type 1A, wide-range type 1B, and long-range type 1C, as shown in these figures. Each of the optical collectors 1A, 1B, and 1C comprises a plurality of contiguously arranged Fresnel lenses 3 which determine discrete or separate fields of view from which they gather infrared radiation, such fields of view determined in each collector are cooperative to define a range of space to be monitored by the detector. The Fresnel lenses 3 in each collector are formed into an integral sheet of a suitable plastic such as polyethylene which is transparent to both infrared radiation of interest and visible light, and are arranged to have a common focal point to converge the infrared radiation from each field of view thereonto.

Figure 6:
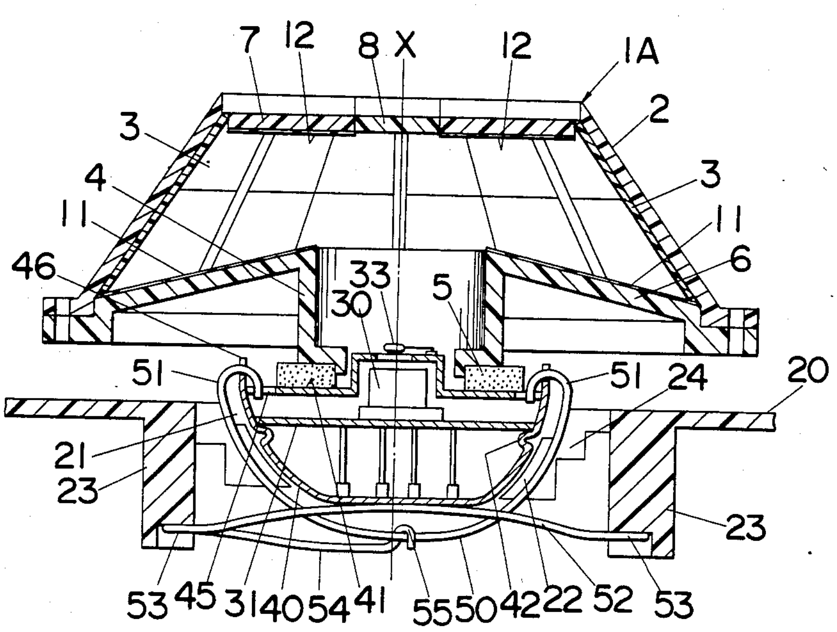
FIG. 6 is a vertical sectional view of the detector of FIG. 1.
Figure 7:
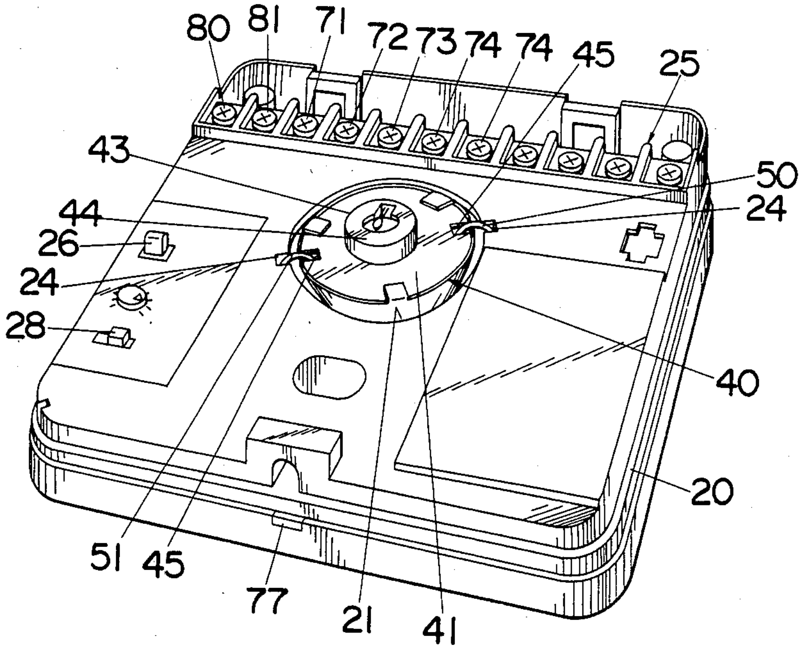
FIG. 7 is a perspective view of a base and a joint member constructing the above detector.
Figure 8:
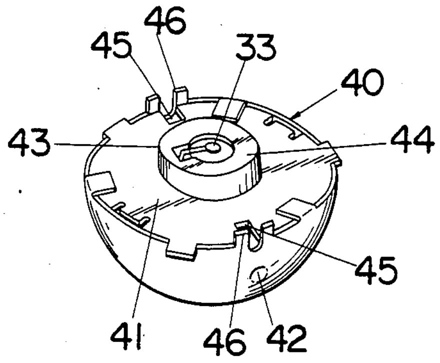
FIG. 8 is an enlarged perspective view of the joint member.

An infrared sensor 30 onto which the infrared radiation received by each of the optical collectors 1A, 1B, and 1C is focused comprises a pyroelectric material enclosed by an envelope. Infrared sensor 30 is held on said base 20. As shown in FIGS. 6 and 7, the base 20 is in the form of a flat casing provided in its upper wall with a center opening 21 for receiving therein a joint member 40. It is this joint member 40 that releasably supports thereon the optical collector 1A, 1B, or 1C selected as well as holds said sensor 30 in a position corresponding to the focal point of the optical collector attached. The joint member 40 is shaped by a magnetically and electrically conductive material such as cold rolled carbon steel into an electrically shielded case of a generally hemispherical configuration with a flat top surface 41. The case or joint member 40 is for receiving therein said sensor 30 together with a first circuit board 31 on which electric components (not shown) are mounted to form an amplifier 34 for amplifying the output signal from the sensor 30, the circuit board 31 being supported at its periphery on integral projections 42 which are formed by indenting the portions of side wall of the case 40, leads 32 from the circuit board 31 extending outwardly through the bottom of the case 40. Projecting centrally on the flat top surface 41 of the joint member 40 is a tubular member or hat 43 into which the sensor 30 projects with its radiation receiving surface exposed through the upper opening of the hat 43. The sensor 30 has its envelope or sheath spaced away from the wall of the joint member 40 for establishing good thermal insulation therebetween. In addition, the hat 43 is formed along its upper opening with an inward flange 44 which occludes the entry to the envelop of the sensor 30 of any undesired or spurious infrared radiation originating from regions other than the fields of view determined by the optical collector, thus preventing the sensor 30 from being influenced by such undesired radiation and therefore preventing it from producing false output.

A light emitting diode (LED) 33 is fixed to the joint member 40 to be spaced just above the sensor 30 in close proximity thereto, the LED 33 being chosen to have dimensions small enough not to substantially affect the radiation receiving capacity of the sensor 30. The LED 33 is employed as a locator light to emit visible light which will pass through the optical collector 1A, 1B, or 1C to reach the individual fields of view, whereby they can be easily located or assigned to the intended regions by adjusting the optical collector in such a manner that the light from the locator light 33 is observed in the intended fields of view, the details of which will be discussed later in conjunction with the circuit arrangement of the infrared detector.

Each of said optical collectors 1A, 1B, and 1C is formed with a central sleeve 4 which extends downwardly from its frame 2 and has on its lower end face a permanent magnet ring 5 of identical configuration which is engageable with the top flat surface 41 of the joint member 40 so as to be releasably attached thereto. When the optical collector 1A, 1B, or 1C is attached to the joint member 40 in this way, said hat 43 extends through the center of the magnet ring 5 into the lower portion of the sleeve 4 in a coaxial relation therewith in order that the sensor 30 is kept at a position exactly corresponding to the focal point of the optical collector selected, as shown in FIG. 6. It should be noted at this time that the coupling by the magnet ring 5 permits the optical collector to rotate about a center axis X of the sensor 30 while keeping the same attached to the joint member 40 and the base 20. This is particularly advantageous for allocating the fields of view to intended regions to be monitored when using the directional optical collectors or those of wide-range and long-range types 1B and 1C, respectively shown in FIGS. 2 and 3.

Figure 9:
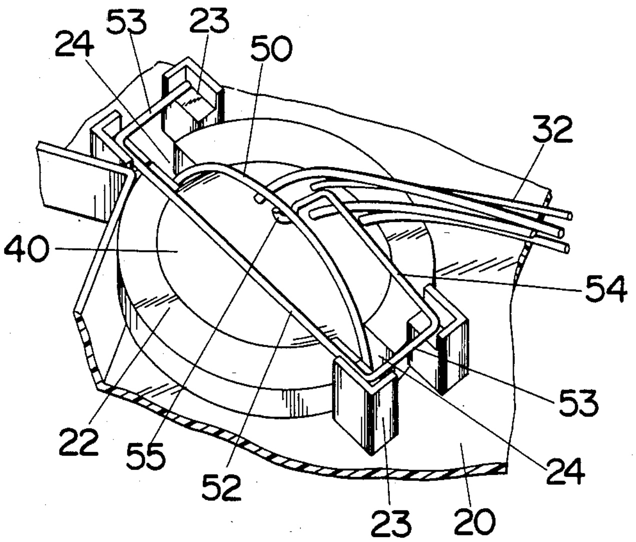
FIG. 9 is an enlarged perspective view of the portion of the base receiving the joint member as viewed from the inside of the base.
Figure 10:
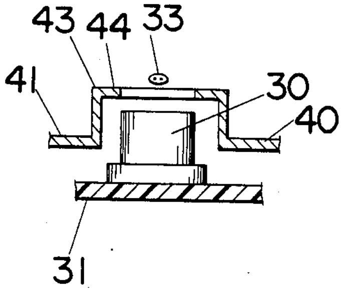
FIG. 10 is an enlarged fractional view of the upper portion of the joint member and a sensor received therein.

Said joint member 40 is pivotally supported on the base 20 by the combination of a semicircularly arcuated support arm 50 and a clip 52. The arcuate arm 50 is formed at both its ends with hooks 51 which extend respectively into diametrically opposed holes 45 in the periphery of the top flat surface 41 of the joint member 40 through bifurcated prongs 46 formed adjacent to the holes 45. The bifurcated prongs 46 serve as aligned bearing which are cooperative to define an axis about which the joint member 40 can pivot in relation to the support arm 50. Said clip 52 is an elongated spring with bent ends 53 and a leg 54 extending inwardly from one bent end 53, as best shown in FIG. 9. The leg 54 has at its free end a catch 55 which is in slidable engagement with the intermediate portion of said support arm 50 to urge it downwardly into a position where the rounded side surface of the joint member 40 is pressed against a correspondingly curved skirt 22 extending on the inner periphery of the central opening 21 of the base 20 so as to allow the joint member 40 to be rotatably supported on the skirt 22. The clip 52 thus urging downwardly the joint member 40 receives the counteracting spring force by which said bent ends 53 is pressed upwardly against the bottoms of posts 23 formed on the underside of the top wall of the base 20 outwardly of the center opening 21 so that the clip 52 holds the joint member 40 within in the center opening 21 of the base 20 by means of said support arm 50. Formed in the diametrically opposed portions of the surrounding wall of the center opening 21 are slots 24 through which the upper end portions of the support arm 50 extend in such a manner that it is only permitted to swing within the plane of said slots 24 or rotate about a horizontal axis passing through the center of the curvature of the support arm 50 in a perpendicular relation to that plane as the catch 55 of the clip 52 slides along the length of the arm 50. Accordingly, the joint member 40 held by the combination support arm 50 and clip 52 on the base 20 can rotate not only about said axis passing through the connections between the hooks 51 and the prongs 46 but also about said horizontal axis which is perpendicular to the former axis. With this arrangement, the sensor 30 and the optical collector attached to the joint member 40 is pivotally supported on the base 20 to be allowed a swivel motion relative to the base 20 for adjustment of the angular position of the optical collector.

Figure 1:
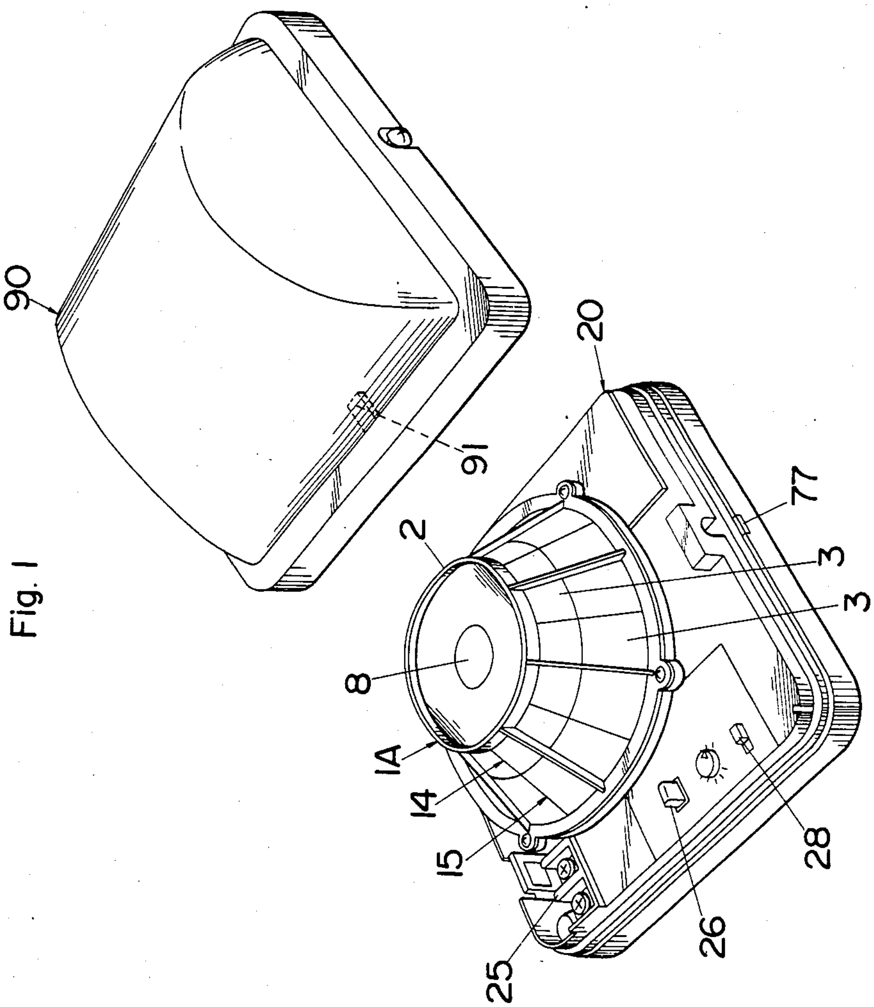
FIG. 1 is a perspective view of a passive infrared detector with an omnidirectional type optical collector in accordance with a preferred embodiment of the present invention.
Figure 2:
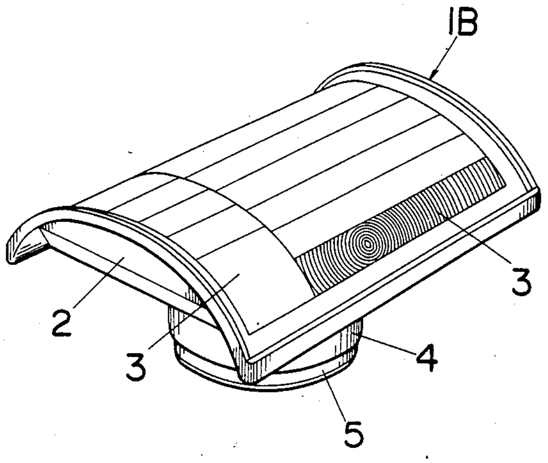
FIG. 2 is a perspective view of a wide-range type optical collector to be selectively adapted to the above detector.
Figure 3:
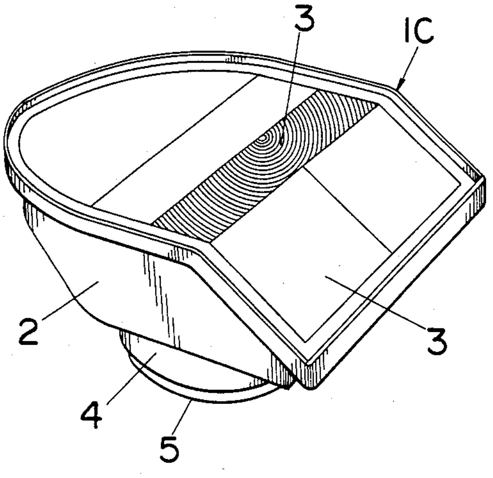
FIG. 3 is a perspective view of a long-range type optical collector to be selectively adapted to the above detector.
Figure 4:
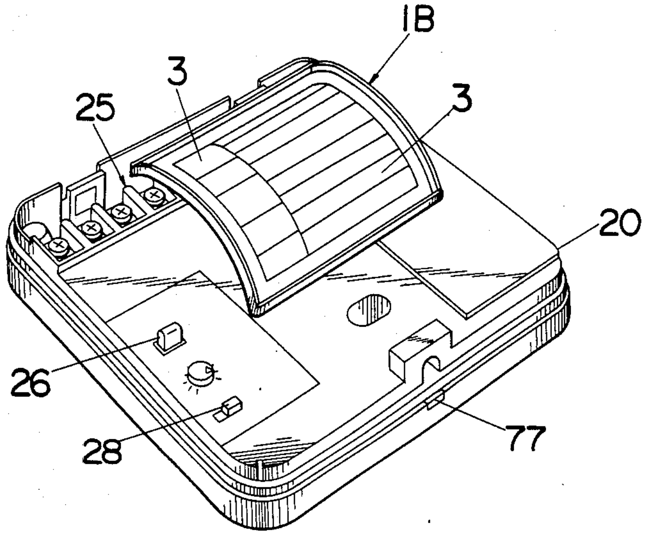
FIG. 4 is a perspective view of the above detector with the wide-range optical collector of FIG. 2 attached.
Figure 5:
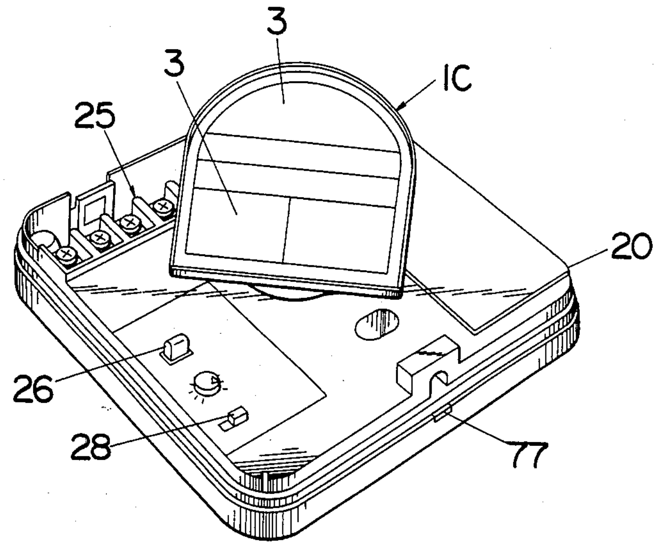
FIG. 5 is a perspective view of the above detector with the long-range optical collector of FIG. 3 attached.

Three types of optical collectors 1A, 1B, and 1C are selectively adapted to the base 20 depending upon different geometrically configurations of the room or area to be monitored or depending upon different mounting positions on which the base 20 is to be installed for the purpose of effectively covering the space intended to be monitored. Each of the optical collectors has frame 2 with a window in which said sheet forming the plural Fresnel lenses 3 is fitted from inside and is secured by suitable adhesive at its periphery. The optical collector 1A of omnidirectional type, as shown in FIGS. 1 and 2, has a general configuration of the frustum of a cone with its side wall defined by the sheet of Fresnel lenses 3 which are arranged along the entire circumference thereof so as to provide a substantially 360 degree field of horizontal coverage. The optical collector 1B which is of wide-range type, as shown in FIGS. 2 and 4, has the sheet of Fresnel lenses 3 shaped into a barrel vault configuration in which the plurality of Fresnel lenses 3 are arranged along the arc thereof so as to provide a wide-angular range covering. In the optical collector 1C of the long-range type, the sheet of Fresnel lenses 3 defines two flat surfaces inclined at an obtuse angle with each other, each surface of which contains the Fresnel lenses having a greater dimension or aperture than those in the other types for effectively collecting radiation from more distant areas.

The omnidirectional type optical collector 1A further includes a first and a second mirror surfaces 11 and 12 which are cooperative to effectively reflect the radiation gathered by the Fresnel lenses 3 onto the sensor 30, while the other two types of the optical collectors are devoid of mirror surface.

Figure 12:
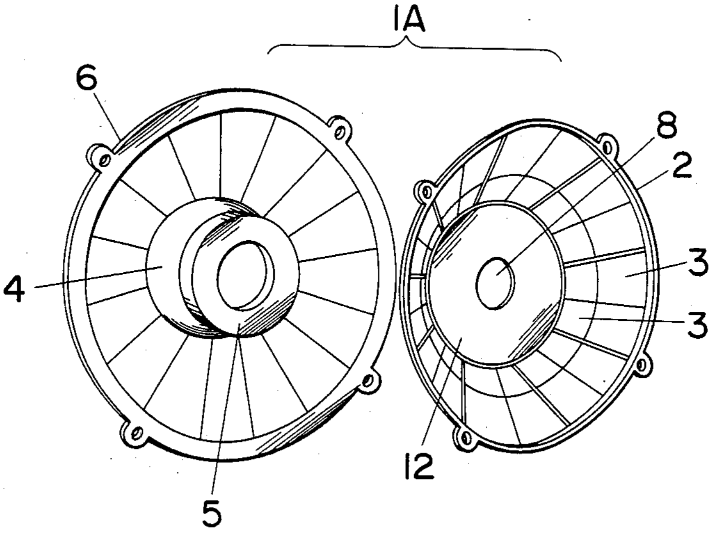
FIG. 12 is an exploded perspective view of the omnidirectional optical collector as viewed from a different angle.
Figure 11:
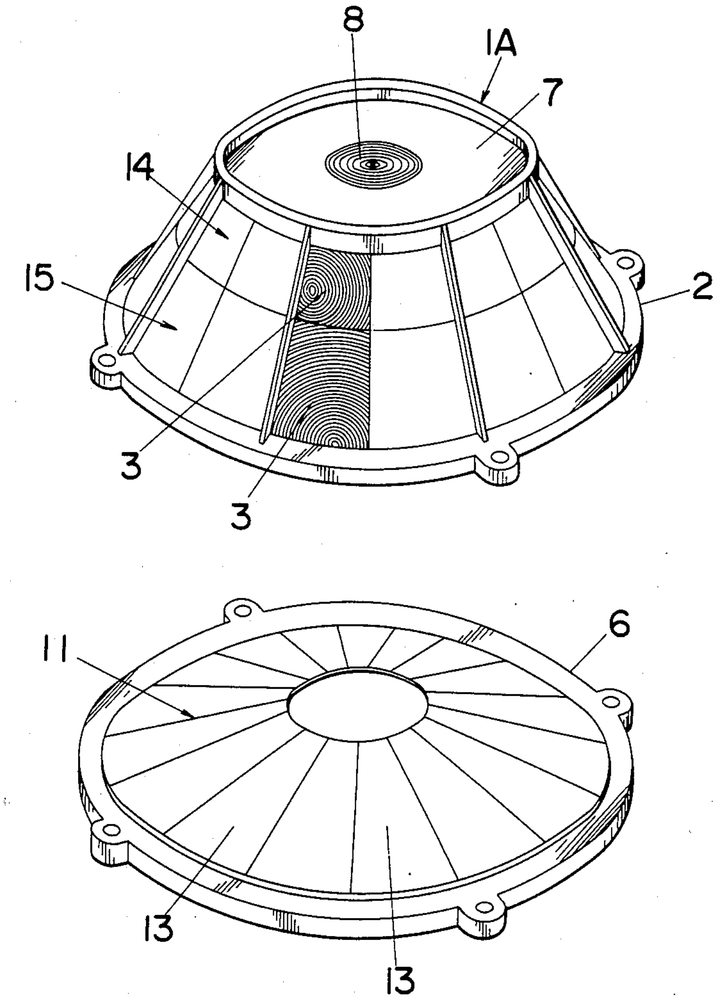
FIG. 11 is an exploded perspective view of the omnidirectional optical collector.
Figure 13:
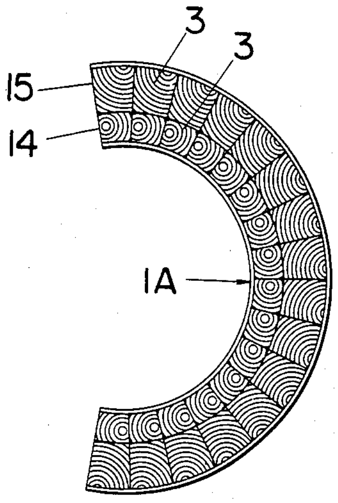
FIG. 13 is a plan view illustrating the patterns of a plurality of Fresnel lenses integrally formed into a sheet employed in constructing the above omnidirectional optical collector.
Figure 14:
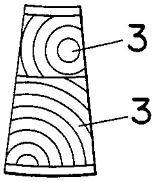
FIG. 14 is a greatly enlarged fragmentary view illustrating the patterns of the Fresnel lenses of FIG. 13.
Figure 17:
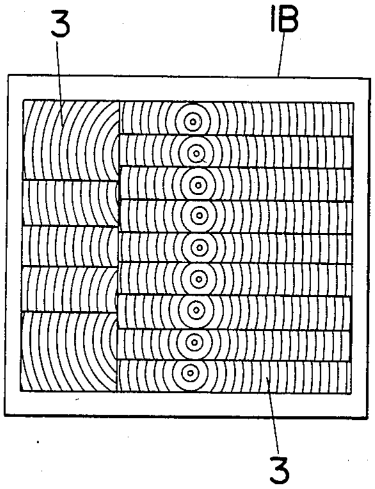
FIG. 17 is a plan view illustrating the patterns of a plurality of Fresnel lenses employed in the above wide-range optical collector of FIG. 2.
Figure 18:
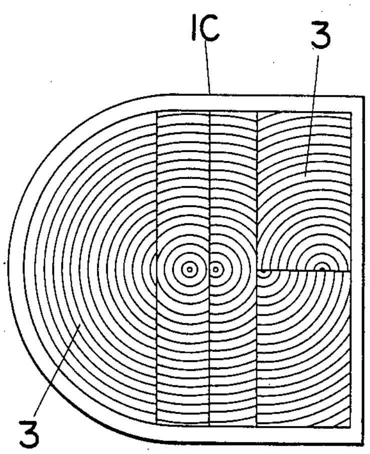
FIG. 18 is a plan view illustrating the patterns of a plurality of Fresnel lenses employed in the above long-range optical collector of FIG. 3.
Figure 15:
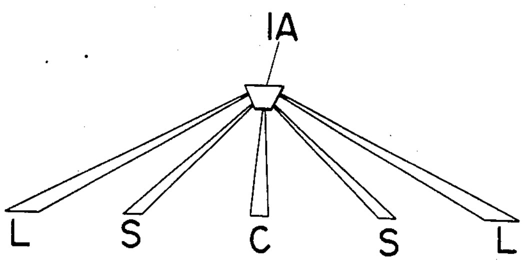
FIG. 15 is a schematic illustration of the vertical fields of view covered by the above omnidirectional optical collector.
Figure 16:
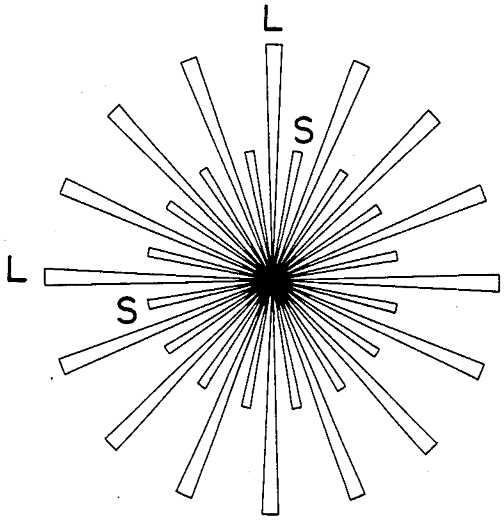
FIG. 16 is a schematic illustration of the horizontal fields of view covered by the above omnidirectional optical collector.
Figure 19:
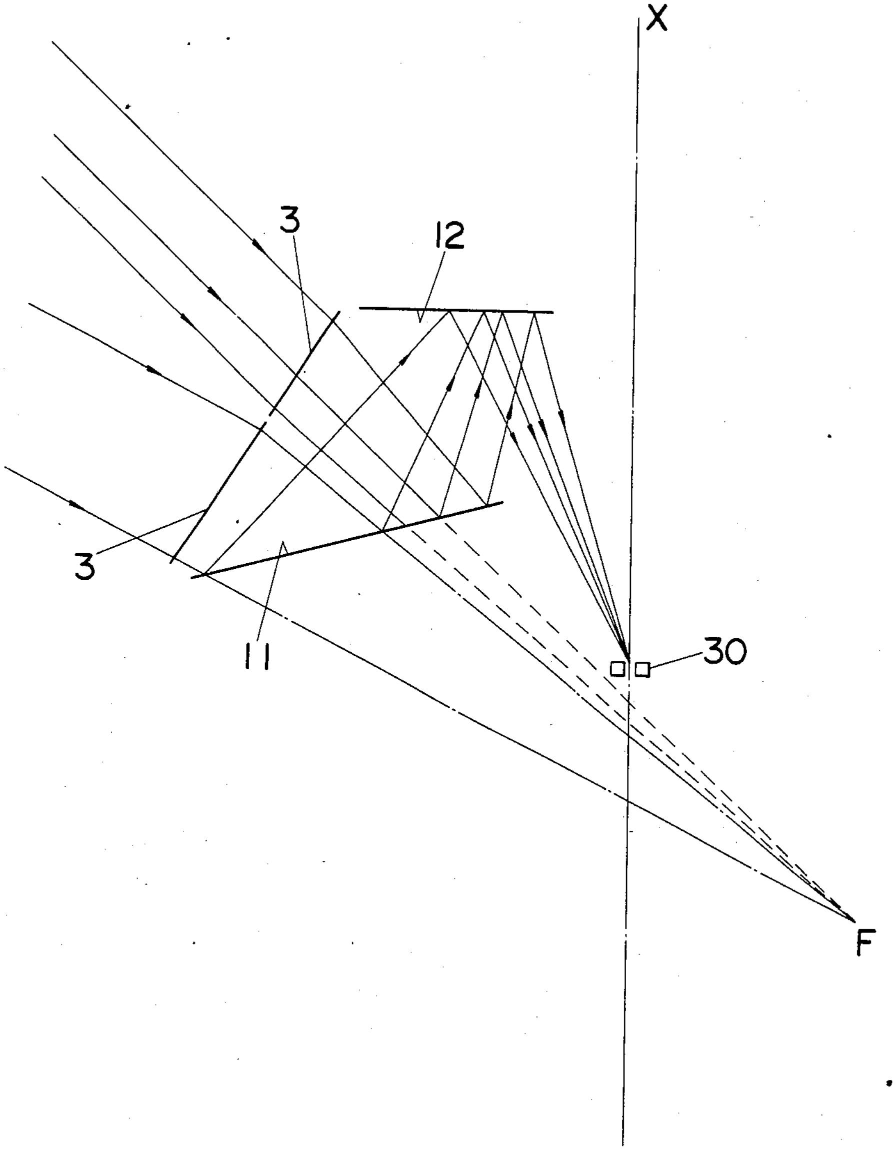
FIG. 19 is a cross sectional view schematically illustrating the optical arrangement of the above omnidirectional optical collector.

Details of the omnidirectional type optical collector 1A will be described in the following with reference to FIGS. 6, 11 and 12. The sheet of Fresnel lenses 3 defining the side wall of the collector are divided into a first and a second circumferentially extending arrays 14 and 15, the first array 14 being disposed near the top and the second array 15 near the bottom of the collector. Each array consists of the same number of trapezoidal Fresnel lenses 3 at different angular dispositions but has the Fresnel lenses of different apertures so that the Fresnel lenses of relatively narrower apertures in the first array 14 are responsible for relatively short-distance fields of view S while those of the relatively wider apertures in the second array 15 for relatively long-distance fields of view L, as best shown in FIGS. 15 and 16. The frame 2 of the optical collector 1A includes a circular bottom plate 6 from the center of which said sleeve 4 extends and which has thereon the first mirror surface 11 consisting of a plurality of circumferentially arranged plane mirror segments 13 corresponding in number to the number of Fresnel lenses 3 in each of the first and second arrays 14 and 15. A second mirror surface 12, which is a ring-shaped plane mirror, is formed on the undersurface of a top plate 7 of plastic material in facing relation with the first mirror surface 11. Said first and second mirror surfaces 11 and 12 may be provided such as by vacuum deposition of aluminium on the respective plates of plastic material. The first and second mirror surfaces 11 and 12 are in such a facing relation with the Fresnel lenses 3 that the converging radiation received from the each field of view through the corresponding Fresnel lens is firstly reflected on the first mirror surface 11 and then reflected on the second mirror surface 12 to be directed onto the sensor 30, as shown in FIG. 19 in which F indicates a common focal point of the Fresnel lenses in the first and second arrays 14 and 15. Another Fresnel lens 8 is formed in the center of the top plate 7 to focus the radiation from the corresponding field of view directly onto the sensor 30, which field of view is indicated by C in FIG. 15.

Figure 20:
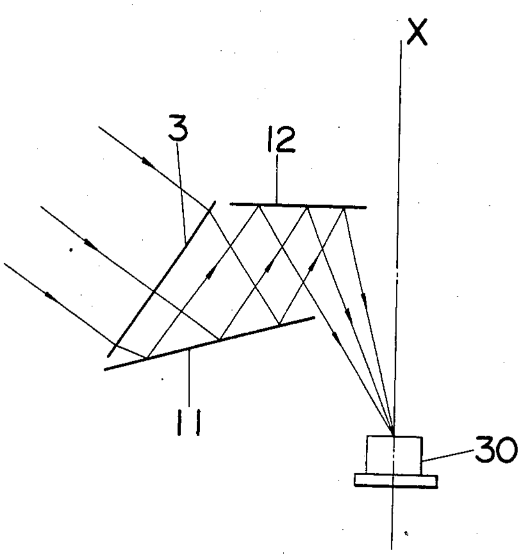
FIG. 20 is a cross sectional view schematically illustrating the optical arrangement similar to FIG. 19 but in a more simplified manner for easy understanding of an advantageous feature of the above omnidirectional optical collector.
Figure 21:
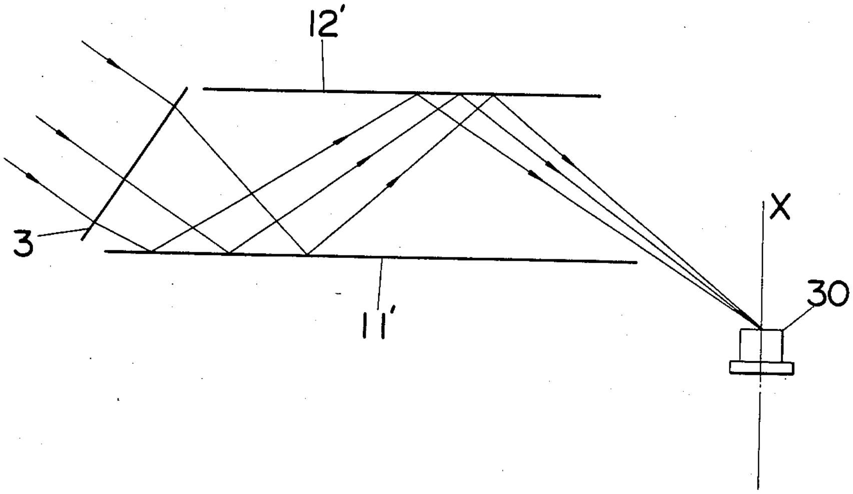
FIG. 21 is a sectional view schematically illustrating a reference optical arrangement introduced for a comparison purpose with that of FIG. 20.
Figure 22:
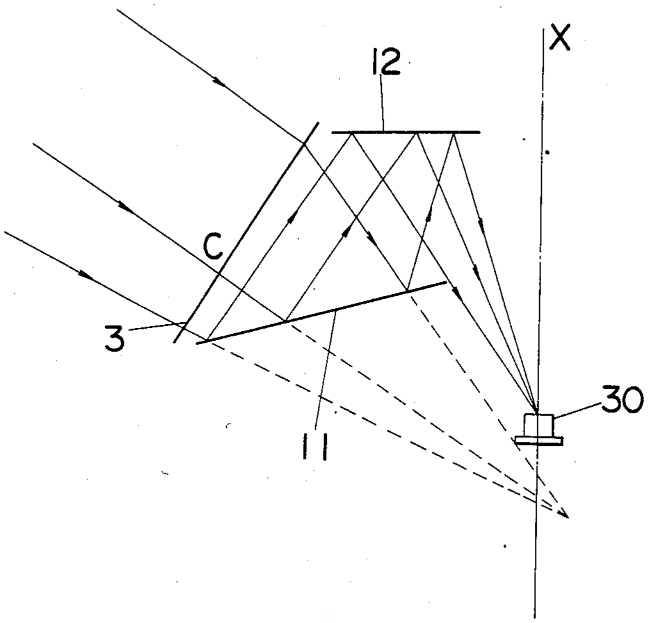
FIG. 22 is another cross sectional view schematically illustrating the optical arrangement similar to FIG. 19 but in a more simplified manner for easy understanding of another advantageous feature of the above omnidirectional optical collector.
Figure 23:
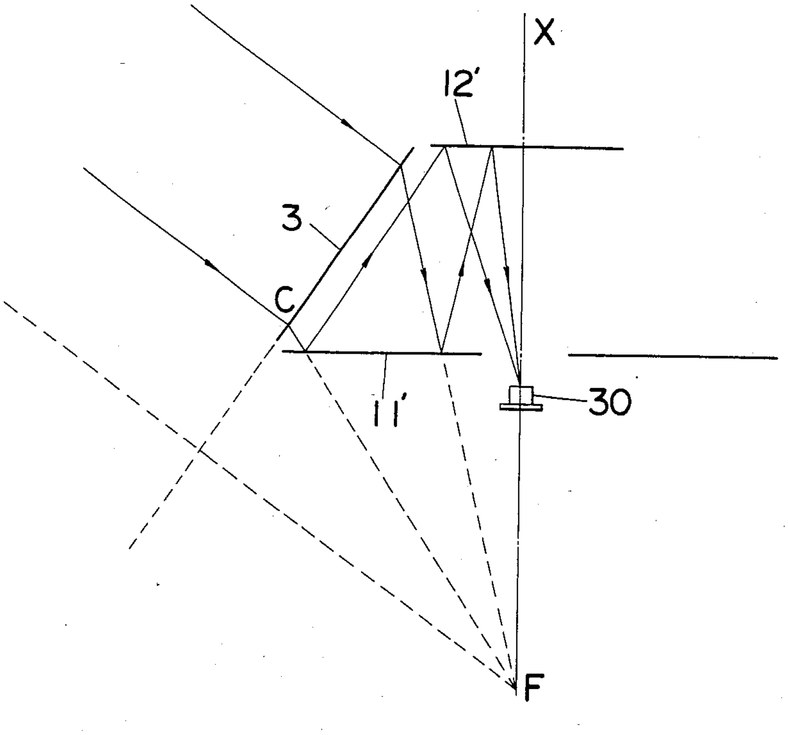
FIG. 23 is a sectional view schematically illustrating a reference optical arrangement introduced for a comparison purpose with that of FIG. 22.

It is to be noted at this time that the first mirror surface 11 is inclined relative to the second mirror surface 12 in such a manner that the distance therebetween is closer at its inward ends than at the outward ends, which arrangement is advantageous for designing the optical collector 1A compact as well as for optimal utilization of the Fresnel lenses 3. These advantageous features will be discussed with the help of FIGS. 20 to 23. In these figures, a single Fresnel lens 3 is shown for simplicity although two adjacent Fresnel lenses 3 will appear in the cross section of the figures in the actual instance. FIGS. 20 and 21 illustrate for comparison purpose two optical systems with a given angle of the Fresnel lens 3 to the center axis X of the sensor 30 and with a given vertical distance therebetween, the optical system shown in FIG. 20 being in conformity to the present embodiment and the other shown in FIG. 21 being a reference system in which the first and second mirror surfaces 11' and 12' are disposed in parallel relation with each other. From these figures, it is easily understood that the inclined combination of the first and mirror surfaces 11 and 12 can certainly reduce the radial or horizontal distance between the Fresnel lens 3 and the sensor 30 to a greater extent than the parallel combination of those does, thus allowing the optical collector 1A of the present embodiment to be made compact particularly with respect to its width dimension. In the meanwhile, the Fresnel lens is known to have a higher capacity of gathering incident radiation per a given area at the portion near the center of the lens than at the portion away therefrom. Therefore, it is desirable to utilize the portion as near the center of the Fresnel lens as possible for increasing the radiation collecting efficiency. The above inclined combination of the first and second mirror surfaces 11 and 12 is also responsible for this purpose, as will be understood with reference to FIGS. 22 and 23, which are introduced for comparison between the optical systems of the present embodiment and a reference system. These figures illustrate the Fresnel lenses 3 of the same focal length and of the same angular relation with respect to the center axis X of the sensor 30 for easy and valid comparison between the above two optical systems. In the reference system with the parallel combination of the first and second mirror surfaces 11' and 12' as shown in FIG. 23, the Fresnel lens 3 has no way but to use its portion far from the center C of lens for successfully focusing the radiation passing the entire aperture of the Fresnel lens 3. This is in contrast to the optical system adopting the inclined combination of the first and second mirror surfaces 11 and 12, as shown in FIG. 22, in which the Fresnel lens 3 is allowed to use its portion near the center C of lens for focusing the radiation onto the sensor 30. Accordingly, the inclined combination of the first and second mirror surfaces 11 and 12 is found to be advantageous to increase the radiation gathering capacity of the Fresnel lenses 3 employed in the omnidirectional optical collector 1A. The patterns of the Fresnel lenses employed in the above optical collector 1A and those employed in the other two types of the optical collectors 1B and 1C are respectively shown in FIGS. 13, 14, 17, and 18. From these figures, it is noted that center portions of the Fresnel lenses are predominantly utilized for the same purpose as described herein. It is also to be noted that said sleeve 4 extending from the center of the bottom plate 6 of the omnidirectional optical collector 1A has its inner surface finished as a non-reflective surface so as to prevent undesired reflection on the inner surface of the sleeve 4, such undesired reflection would otherwise direct unintended or spurious radiation from other than the fields of view to the sensor 30 and possibly cause it to produce a false detection output.

Turning back to FIG. 1, the infrared detector of the present invention further includes a shield 90 which is removably attached to the base 20 over the optical collector 1A, 1B, or 1C so as to protect it as well as make it imperceptible, which shield 90 being made of plastic material such as polyethylene which is transparent to infrared radiation but visually opaque to visible light.

Figure 24:
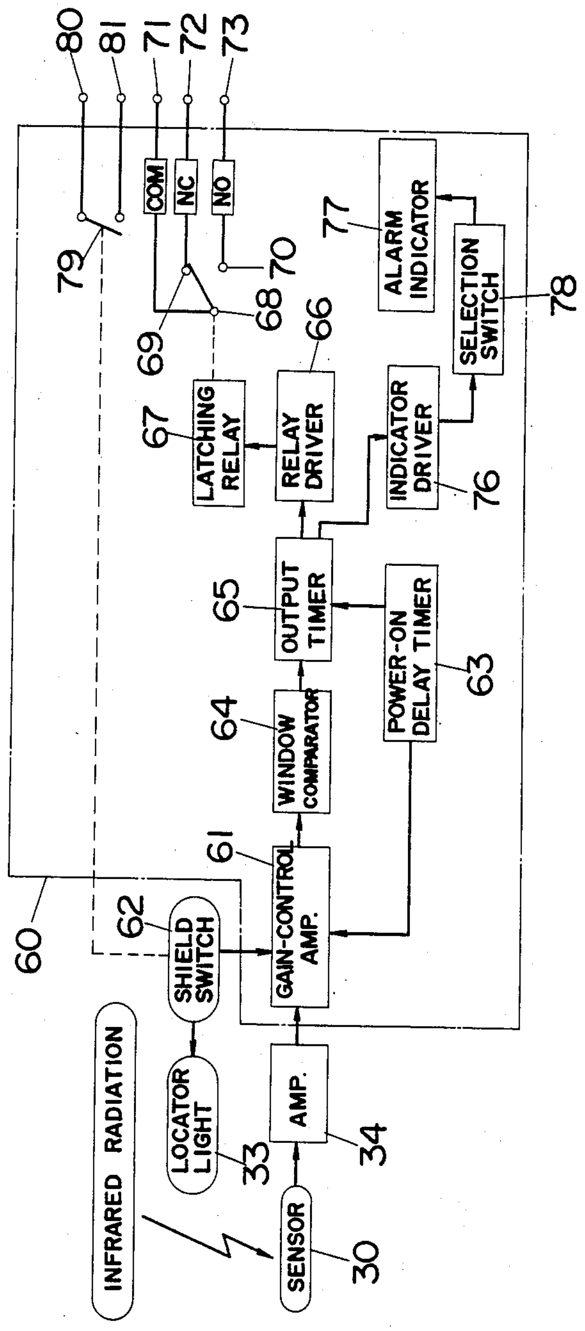
FIG. 24 is a block circuit diagram illustrating a signal processing circuit of the above detector.

Received within the base 20 is a second circuit board (not shown) carrying thereon electric components which forms a signal processing circuit 60. FIG. 24 illustrate a block circuit diagram of the signal processing circuit 60 which is connected through the amplifier 34 formed on said first circuit board 31 enclosed within the electrically shielded case or joint member 40 to the sensor 30 also received therein. The output signal from the sensor 30 is amplifed by the amplifier 34 which delivers the amplified signal representative of the magnitude of received radiation through the optical collector 1A, 1B, or 1C selected to a gain control amplifier 61, the gain of which can be altered by the function of a cooperative shield switch 62 and a power-on delay timer 63.

Said shield switch 62 has a push button 26 which projects on said base 20 and is actuated by a complementary finger 91 projecting inside of the shield 90 at the time of the shield 90 being attached to the base 20 so that the shield switch 62 provides an output to lower the gain of the gain control amplifier 61, while it is released from the finger 91 at the time of the shield 90 removed so that it provides no such output of reducing the gain. The reduction in the gain is such that the output of the gain control amplifier 61 provides the same criteria or level for judging the presence of a human being in the space to be monitored irrespective of whether the shield 90 is attached or removed. In other words, the combination of the shield switch 62 and the gain control amplifier 61 can compensate the attenuation in the magnitude of incident radiation when the shield 90 is attached for the purpose of providing the same level of output from the gain control amplifier 61 as in the case when the shield 90 is removed. Accordingly, the detector of the present invention can assure the same detection result with or without the shield 90.

Said power-on delay timer 63 in response to the circuit being initially energized produces a control output of limited time interval, i.e., 30 sec., which control output is fed to the gain-control amplifier 61 to disable the same within such limited time interval for avoiding possible malfunction at the initial stage of starting the circuit where the components of the circuit may remain unstable, thus ensuring a reliable detection.

Said shield switch 62 is also connected to the aforementioned locator light or light emitting diode 33 in such a manner as to turn it on only in response to the removal of the shield 90. Thus, when the shield 90 is removed to expose the optical collector 1A, 1B, or 1C, the visible light emitted will pass through the optical collector to reach the individual fields of view, whereby the operator can easily adjust the angular position of the optical collector 1A, 1B, or 1C selectively attached to the base 20 by observing the light from at the intended fields of view. The light emitting diode 33 is turned off when the shield 90 is attached on the base 20 after locating the fields of view.

The output of the gain-control amplifier 61 is then fed to a window comparator 64 where it is compared with each of predetermined upper and lower threshold level so that a pulse is delivered from the window comparator 64 only when the signal from the gain-control amplifier 61 exceeds the upper threshold level, which is indicative of a person entering one of the fields of view, or falls below the lower threshold level, which is indicative of the person leaving the field of view. Thus, the window comparator 64 recognizes a characteristic change in the magnitude of the received radiation which occurs in response to the person entering any one of the fields of view or the person leaving therefrom and provides an output pulse representative of such change in the magnitude of the received radiation. The output pulse from the window comparator 64, thus indicating the human presence in one or more of the fields of the view, is then delivered to an output timer 65 which responds to produce a timer pulse for a limited time interval of at least 1.5 to 2.0 sec. It is noted at this time that said power-on delay timer 63 also delivers its control output of limited time interval to this output timer 65 so as to interrupt it at the initial stage of starting the circuit for the same reason as described above. The timer pulse from the output timer 65 is fed to a relay driver 66 which sets a latching relay 67 at the rising edge of the timer pulse and resets it at the falling edge thereof. The latching relay 67 has its common, normally-closed, and normally-open contacts 68, 69, and 70 connected respectively to individual output terminals 71, 72, and 73 which are utilized to drive an external alarm means for providing the alarm indication at a station remote from the detector. These output terminals 70, 71, and 72 are arranged in a terminal block 25 which is mounted on the base 20 and includes a pair of power input terminals 74 for energization of the circuit. Said timer pulse from the output timer 65 is simultaneously fed to an indicator driver 76 to trigger it into operation of turning on an alarm indicator 77 for such limited time period, which alarm indicator 77 is a light emitting diode provided on the side wall of the base 20 at the portion not covered by the shield 90. A selection switch 78, of which knob 28 is disposed on the base 20 and accessible when the shield 90 is removed, is inserted between the indicator driver 76 and the alarm indicator 77 for connection and disconnection therebetween so that the alarm indicator 77 can be rendered inoperative as necessary. Said shield switch 62 is operatively connected also to a contact set 79 leading to output terminals 80 and 81 in said terminal block 25, by utilization of which output terminals 80 and 81 a suitable external circuit can be operative to acknowledge whether or not the shield 90 is removed.

What is claimed is:

1. In a passive infrared detector comprising a base to be installed on a mounting surface, an infrared sensor held on the base, an optical collector which gathers infrared radiation from a space to be monitored and focuses such radiation onto said sensor on the base, said sensor being operative in response to receiving the infrared radiation to produce an output signal indicative of the human presence in the space, the improvement comprising a detector having a joint member which holds the sensor and which is pivotally supported on the base, said optical collector being attached to the base by means of the joint member so as to be rotatable together with the sensor in relation to the base for adjustment of its angular position, said optical collector being releasably attached to the joint member, said joint member being shaped as an electrically shielded case with an opening, said case receiving therein said sensor together with an electric circuitry connected to the sensor such that the radiation receiving surface of the sensor is exposed outwardly through the opening, said electric circuitry including an amplifier connected to the sensor for amplifying the output signal therefrom, said optical collector being one of a plurality of different types of units having radiation receiving surfaces of different angular orientations which determine different fields of view covering said space to be monitored, the units being formed with a common coupling end to be releasably attached to the joint member on the base, one of the coupling end and the joint member comprising a permanent magnet and the other comprising a magnetic material to be releasably attached thereto, and said joint member being formed with a hat which prevents spurious infrared radiation emanating from areas other than the space intended to be monitored from impinging an envelope of the sensor so as to keep the sensor thermally insulated away from such spruious radiation.

2. A passive infrared detector as set forth in claim 1, wherein said optical collector attached to the base is shaped into a general configuration of the frustum of a cone with a top wall, a side wall, and a bottom wall, said conical sidewall being defined by a plurality of Fresnel lenses arranged around the entire circumference thereof at different angular dispositions to determine separate fields of view from which they gather the infrared radiation, said Fresnel lenses having a common focal point so as to focus the radiation directed through each of the lenses onto said sensor, said optical collector including a first mirror surface on the bottom wall and a second mirror surface on the top wall, said first and second mirror surfaces confronting each other and being cooperative with the Fresnel lenses such that the radiation directed through each of the lenses is reflected in succession on the first and second mirror surfaces to be directed onto the sensor, the bottom wall being formed at its center with an aperture in which said sensor is positioned to receive the reflected radiation, and said first mirror surface being inclined with respect to the second mirror surface so that the distance therebetween is closer at the inward ends than at the outward ends.

3. A passive infrared detector as set forth in claim 1, wherein said optical collector comprises a plurality of Fresnel lenses which is transparent to visible light and wherein a locator light source is disposed in proximity to the sensor for emitting a visible light which will pass through the Fresnel lenses to reach the space to be monitored.

4. In a passive infrared detector comprising a base to be installed on a mounting surface, an infrared sensor held on the base, an optical collector which gathers infrared radiation from a space to be monitored and focuses such radiation onto said sensor on the base, and a signal processing circuit coupled to the sensor to produce an output signal indicative of human presence in that space when the received radiation sees a characteristic change in its magnitude, the improvement comprising:

said optical collector comprising Fresnel lenses which are transparent to both the infrared radiation and visible light;

a joint member to which the sensor is fixed and which is pivotally supported on the base;

said optical collector being releasably coupled to the joint member so as to be rotatable together with the sensor in relation to the base for adjustment of its angular position;

a locator light source disposed in proximity to the sensor for emitting visible light through the optical collector to the space to be monitored;

a removable shield covering the optical collector, said shield being translucent to infrared radiation but substantially impervious to the visible light;

means responding to the shield being removed for turning on the locator light source; and sensitivity adjusting means which is operative in response to the shield being attached to compensate the attenuation in the output from the sensor receiving the radiation through the shield by such an extent that said signal processing circuit can determine the human presence based on the same output level from the sensor irrespective of whether the shield is attached or removed.

* * * * *